United States Patent
Taniguchi et al.

(10) Patent No.: US 10,428,886 B2
(45) Date of Patent: Oct. 1, 2019

(54) BICYCLE DISC BRAKE ROTOR

(71) Applicant: Shimano Inc., Sakai, Osaka (JP)

(72) Inventors: Masanori Taniguchi, Sakai (JP); Yusuke Hosomi, Sakai (JP); Noriko Masuta, Sakai (JP); Masahiro Nakakura, Sakai (JP)

(73) Assignee: SHIMANO INC., Osaka (JP)

(*) Notice: Subject to any disclaimer, the term of this patent is extended or adjusted under 35 U.S.C. 154(b) by 3 days.

(21) Appl. No.: 15/083,306

(22) Filed: Mar. 29, 2016

(65) Prior Publication Data

US 2017/0284489 A1    Oct. 5, 2017

(51) Int. Cl.
F16D 65/12    (2006.01)
F16D 65/02    (2006.01)

(52) U.S. Cl.
CPC ......... F16D 65/123 (2013.01); F16D 65/128 (2013.01); *F16D 2065/132* (2013.01); *F16D 2065/1316* (2013.01); *F16D 2065/1328* (2013.01); *F16D 2065/1332* (2013.01); *F16D 2065/1392* (2013.01)

(58) Field of Classification Search
CPC ...... F16D 65/12; F16D 65/123; F16D 65/128; F16D 2065/1316; F16D 2065/136; F16D 2065/1364; F16D 2065/1368; F16D 2065/1348; F16D 2065/1384; F16D 2065/1392

See application file for complete search history.

(56) References Cited

U.S. PATENT DOCUMENTS

| | | | | |
|---|---|---|---|---|
| 2004/0200674 A1* | 10/2004 | Campbell | ............... | B62L 1/005 188/26 |
| 2005/0092561 A1* | 5/2005 | Okabe | .................... | B62L 1/005 188/218 XL |
| 2005/0161296 A1* | 7/2005 | Okabe | .................... | F16D 65/12 188/218 XL |
| 2006/0037819 A1 | 2/2006 | Takizawa | | |
| 2006/0054422 A1* | 3/2006 | Dimsey | ................... | F16D 65/12 188/17 |
| 2007/0187189 A1* | 8/2007 | Takeuchi | ................ | F16D 65/12 188/26 |
| 2011/0048876 A1* | 3/2011 | Bujak | ..................... | F16D 65/12 188/218 XL |
| 2011/0240420 A1* | 10/2011 | Souwa | .................... | F16D 65/12 188/218 XL |

(Continued)

FOREIGN PATENT DOCUMENTS

| | | | | |
|---|---|---|---|---|
| CN | 104309753 | * | 1/2015 | ........... F16D 65/123 |
| DE | 102009003643 A1 | * | 9/2010 | ............. F16D 65/12 |

OTHER PUBLICATIONS

Machine translation of CN 104309753 (no date).*
Machine translation of DE 102009003643 (no date).*

*Primary Examiner* — Nicholas J Lane

(57) ABSTRACT

A bicycle disc brake rotor including a center rotational axis is provided with an outer member including a braking portion extending in a rotation direction of the bicycle disc brake rotor and an inner member located at an inner side of the outer member in a radial direction of the bicycle disc brake rotor and coupled to the outer member. At least one of the outer member and the inner member includes a displacement reducing structure configured to reduce displacement of the braking portion in an axial direction of the bicycle disc brake rotor.

17 Claims, 8 Drawing Sheets

(56) References Cited

U.S. PATENT DOCUMENTS

| | | | |
|---|---|---|---|
| 2013/0168193 A1 | 7/2013 | Iwai et al. | |
| 2014/0097051 A1* | 4/2014 | Moore | F16D 65/123 |
| | | | 188/218 XL |
| 2015/0047932 A1* | 2/2015 | Shinagawa | F16D 65/12 |
| | | | 188/218 XL |
| 2015/0060218 A1* | 3/2015 | Liu | F16D 65/12 |
| | | | 188/218 XL |
| 2015/0144441 A1* | 5/2015 | Kuo | F16D 65/847 |
| | | | 188/218 XL |

* cited by examiner

BICYCLE DISC BRAKE ROTOR

TECHNICAL FIELD

The present invention relates to a bicycle disc brake rotor.

BACKGROUND

Disc brake rotors are used in the automobile and motorcycle field. Reduction of abrasion and thermal deformation has always been a challenge for disc brake rotors.

In the automobile industry, an inner hat rotor is known to reduce thermal deformation of a disc brake rotor that is formed from cast iron. However, the inner hat rotor increases the weight of the brake rotor.

A floating rotor is known as a disc brake rotor for a motorcycle. However, the floating rotor includes a floating support structure that adds weight to the disc brake rotor and increases vibration and noise of the rotor.

In the bicycle industry, bicycle disc brake systems are under development. For example, US 2013/168193 A1, which is incorporated herein by reference, describes a bicycle disc brake rotor including cooling fins. The cooling fins increase the heat radiation capacity of the bicycle disc brake rotor.

SUMMARY

In a lightweight bicycle disc brake rotor, thermal expansion resulting from brake heat may displace a braking portion of the disc brake rotor in the axial direction of the bicycle disc brake rotor. As a result, the braking portion may interfere with a brake pad located at a rest position (non-actuated position) and produce friction noise. Friction noise indicates the production of unnecessary friction resistance and is not desirable for the cyclist.

The inventors of the present application have conducted studies on a novel mechanical structure that reduces friction noise and completed the invention of the present application.

A first aspect of the present invention is a bicycle disc brake rotor including a center rotational axis. The bicycle disc brake rotor is provided with an outer member including a braking portion extending in a rotation direction of the bicycle disc brake rotor. An inner member is located at an inner side of the outer member in a radial direction of the bicycle disc brake rotor and coupled to the outer member. At least one of the outer member and the inner member includes a displacement reducing structure configured to reduce displacement of the braking portion in an axial direction of the bicycle disc brake rotor.

In a second aspect of the bicycle disc brake rotor according to the first aspect, the displacement reducing structure in includes an expansion portion that expands in accordance with expansion of the braking portion in the radial direction resulting from brake heat.

In a third aspect of the bicycle disc brake rotor according to the first or second aspect, the inner member includes a mounting portion for a bicycle wheel and an arm that extends outward in the radial direction from the mounting portion. The outer member includes a tab that extends inward in the radial direction from the braking portion to be coupled to the arm. The expansion portion includes at least one of the arm and the tab.

In a fourth aspect of the bicycle disc brake rotor according to the third aspect, the arm includes a downstream arm edge at a downstream side in the rotation direction. As a hypothetical straight line is drawn in the radial direction from the center rotational axis and through a coupling portion of the tab and the arm, the downstream arm edge is arranged to form an open space between the hypothetical straight line and the downstream arm edge in a view of the hypothetical straight line from the axial direction.

In a fifth aspect of the bicycle disc brake rotor according to the third or fourth aspect, the tab includes an upstream tab edge at an upstream side in the rotation direction. As a hypothetical straight line is drawn in the radial direction from the center rotational axis and through a coupling portion of the tab and the arm, the upstream tab edge is arranged to form a tab open space between the hypothetical straight line and the upstream tab edge.

In a sixth aspect of the bicycle disc brake rotor according to any one of the third to fifth aspects, the outer member includes a through hole, which extends from the braking portion toward a coupling portion of the tab and the arm, and two opposing portions, which are opposed in the rotation direction with the through hole located in between. As a first hypothetical straight line is drawn from the coupling portion to contact the through hole at a side where one of the opposing portions is located and a second hypothetical straight line is drawn from the coupling portion to contact the through hole at a side where the other one of the opposing portions is located, an angle between the first hypothetical straight line and the second hypothetical straight line about the coupling portion is less than 45 degrees in a view of the first hypothetical straight line and the second hypothetical straight line from the axial direction.

In a seventh aspect of the bicycle disc brake rotor according to any one of the third to sixth aspects, the arm has an arm thickness in the axial direction and an arm width in the rotation direction. A ratio of the arm thickness to the arm width is set to 0.66 or greater.

In an eighth aspect of the bicycle disc brake rotor according to any one of the third to seventh aspects, the arm of the inner member is one of a plurality of arms, and the tab of the outer member is one of a plurality of tabs.

A ninth aspect of the bicycle disc brake rotor according to eighth aspect further includes a cooling fin located inward in the radial direction from the braking portion of the outer member. The tabs each include an upstream tab edge at an upstream side in the rotation direction, and the cooling fin includes a downstream fin edge at a downstream side in the rotation direction and is arranged to form a fin open space between the downstream fin edge and the upstream tab edge.

In a tenth aspect of the bicycle disc brake rotor according to the ninth aspect, the cooling fin includes a step in the rotation direction, and the step includes an opening.

In an eleventh aspect of the bicycle disc brake rotor according to the tenth aspect, the step extends inclined relative to the radial direction.

In a twelfth aspect of the bicycle disc brake rotor according to any one of the ninth to eleventh aspect, the cooling fin is arranged between respective ones of the tabs in the rotation direction.

In a thirteenth aspect of the bicycle disc brake rotor according to any one of the third to twelfth aspects, the tab is coupled to the arm by a coupling pin.

In a fourteenth aspect of the bicycle disc brake rotor according to any one of the third to thirteenth aspects, the outer member is coupled to the arm at a side opposite to the bicycle wheel.

In a fifteenth aspect of the bicycle disc brake rotor according to any one of the first to fourteenth aspects, the braking portion includes a non-uniform radial width between a radially outermost edge and a radially innermost edge, and the non-uniform radial width includes a maximum radial width and a minimum radial width that is 65% or less of the maximum radial width.

In a sixteenth aspect of the bicycle disc brake rotor according to the fifteenth aspect, the outer member includes a notch formed in at least one of the radially outermost edge and the radially innermost edge to obtain the minimum radial width in the braking portion, and the expansion portion includes a part corresponding to the notch and the minimum radial width of the braking portion.

In a seventeenth aspect of the bicycle disc brake rotor according to any one of the first to sixteenth aspects, the braking portion includes a plurality of recesses arranged in the rotation direction. The recesses each have a recess width in the rotation direction. Two of the recesses that are adjacent to each other in the rotation direction are spaced apart by a minimum distance in the rotation direction. A ratio of the minimum distance to the recess width is 2.5 or greater.

In an eighteenth aspect of the bicycle disc brake rotor according to the seventeenth aspect, the recesses are each formed to extend along a longitudinal axis, and a minimum angle of the longitudinal direction from the radial direction is 80 degrees or less.

In a nineteenth aspect of the bicycle disc brake rotor according to any one of the first to eighteenth aspects, the outer member includes a base, a first cover located on one side of the base in the axial direction, and a second cover located on another side of the base in the axial direction. The base is formed from a first material. The first base is formed from a second material that differs from the first material. The second cover is formed from a third material that differs from the first material.

In a twentieth aspect of the bicycle disc brake rotor according to the nineteenth aspect, the second material and the third material are the same.

In a twenty-first aspect of the bicycle disc brake rotor according to the nineteenth or twentieth aspect, the first cover has a first cover thickness in the axial direction, the second cover has a second cover thickness in the axial direction, and the second cover thickness differs from the first cover thickness.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

Figure 1:
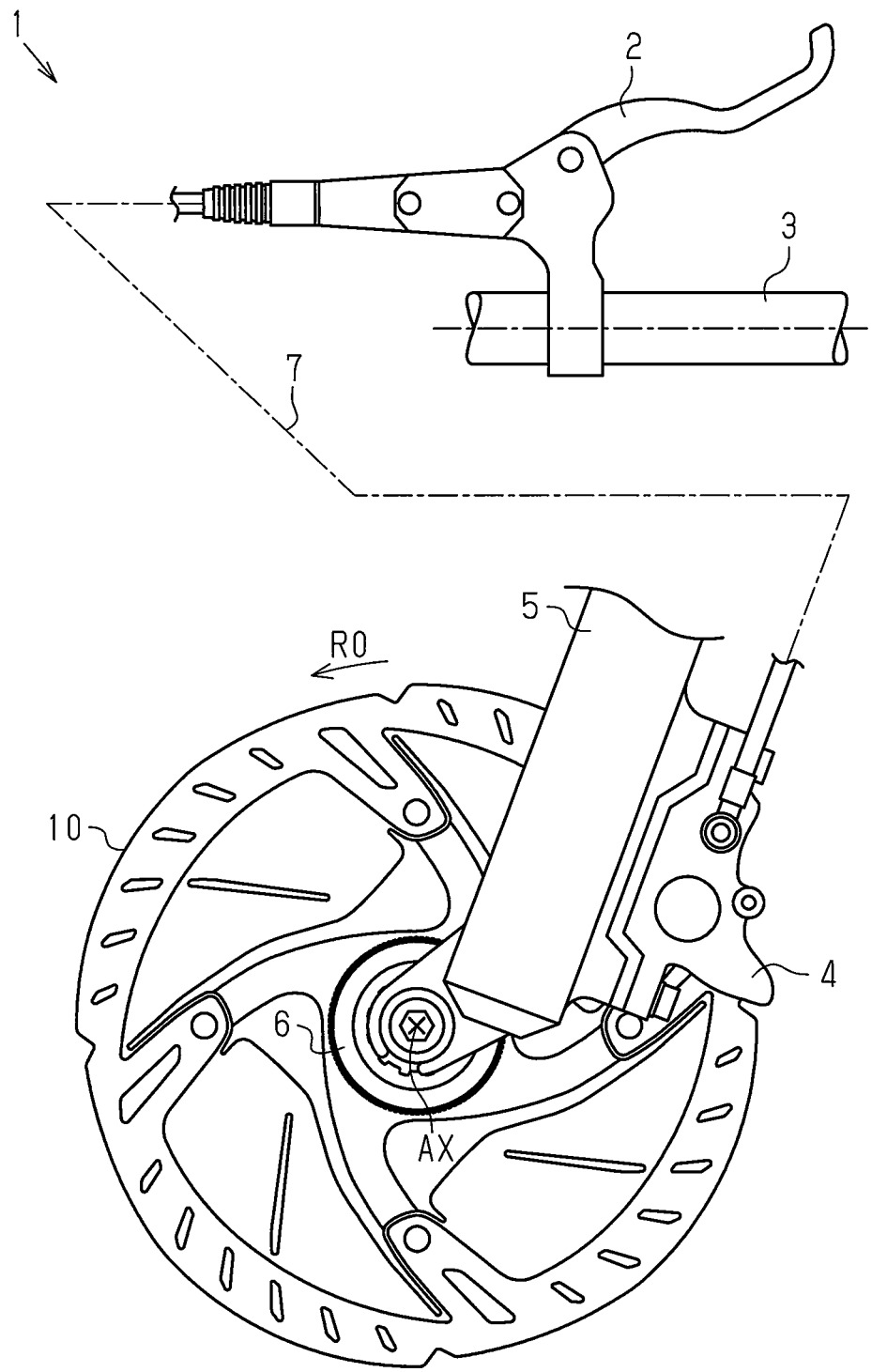
FIG. 1 is a schematic diagram of a bicycle disc brake system.

A bicycle disc brake system 1 will now be described with reference to FIG. 1. The bicycle disc brake system 1 includes a brake operation device 2 such as a brake lever device, a brake caliper 4, and a bicycle disc brake rotor 10. The brake operation device 2 is coupled to, for example, a bicycle handlebar 3. When the bicycle disc brake system 1 is a bicycle front brake, the brake caliper 4 is coupled to, for example, a front fork 5. The bicycle disc brake rotor 10 includes a center rotational axis AX and is fixedly coupled to a bicycle wheel (e.g., hub shell) by, for example, a lock ring 6. When the bicycle travels forward, the bicycle disc brake rotor 10 rotates in a rotation direction RO.

The brake operation device 2, which is manually operated by a user who may be the cyclist, outputs a brake command that is in accordance with a braking request of the user. The brake operation device 2 is hydraulically, mechanically, or electrically connected to the brake caliper 4 by a brake command transmission medium 7 such as a hydraulic hose, a control cable, or a wired or wireless electric signal link. In response to a brake command from the brake operation device 2, the brake caliper 4 presses brake pads (not illustrated) against the bicycle disc brake rotor 10. This generates a braking force with the bicycle disc brake rotor 10.

Figure 2:
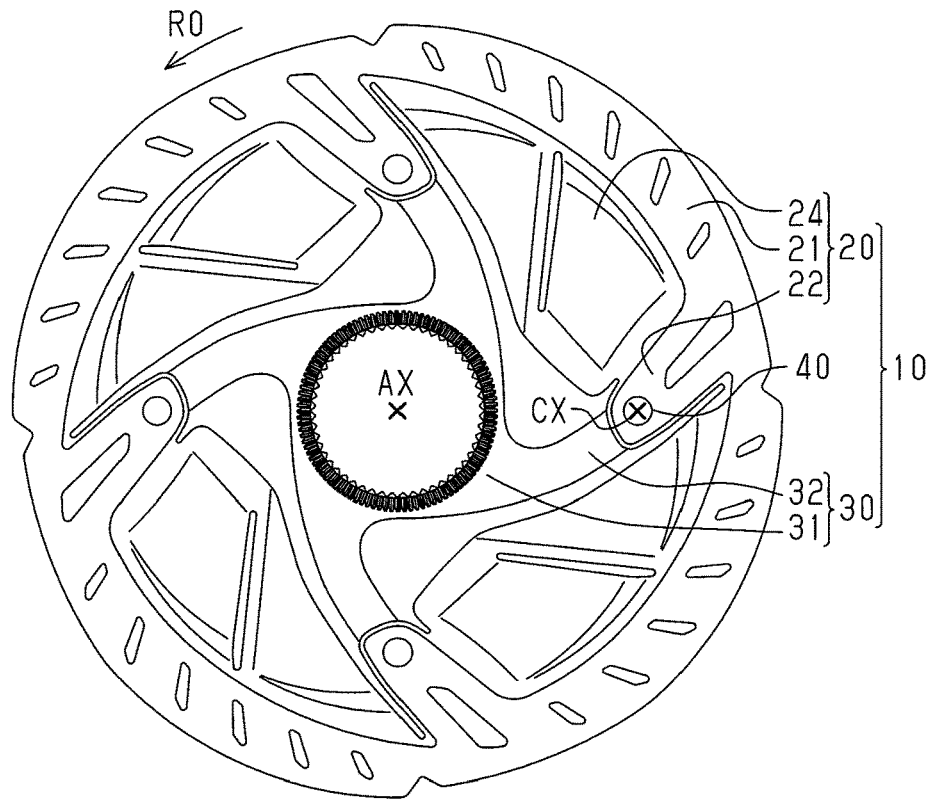
FIG. 2 is a plan view illustrating one embodiment of a bicycle disc brake rotor.
Figure 3:
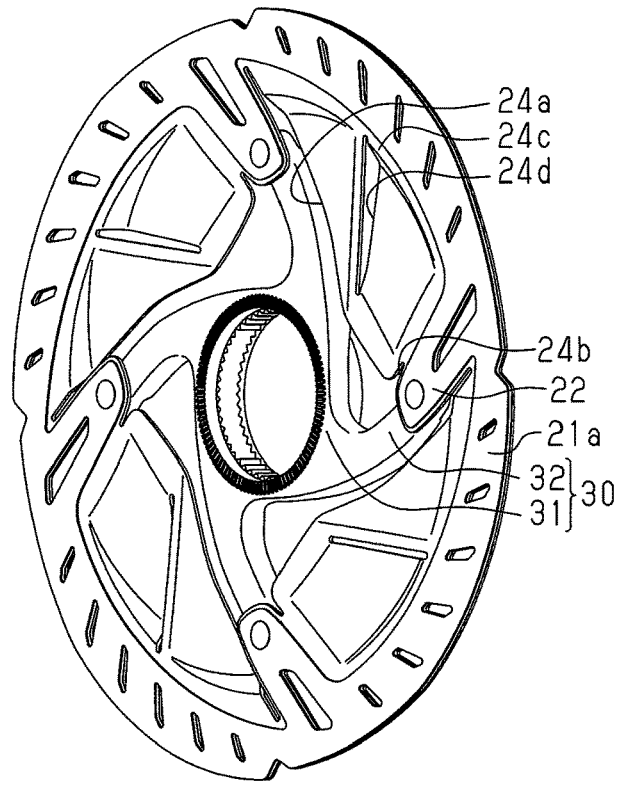
FIGS. 3 and 4 are perspective views of the bicycle disc brake rotor illustrated in FIG. 2.
Figure 4:
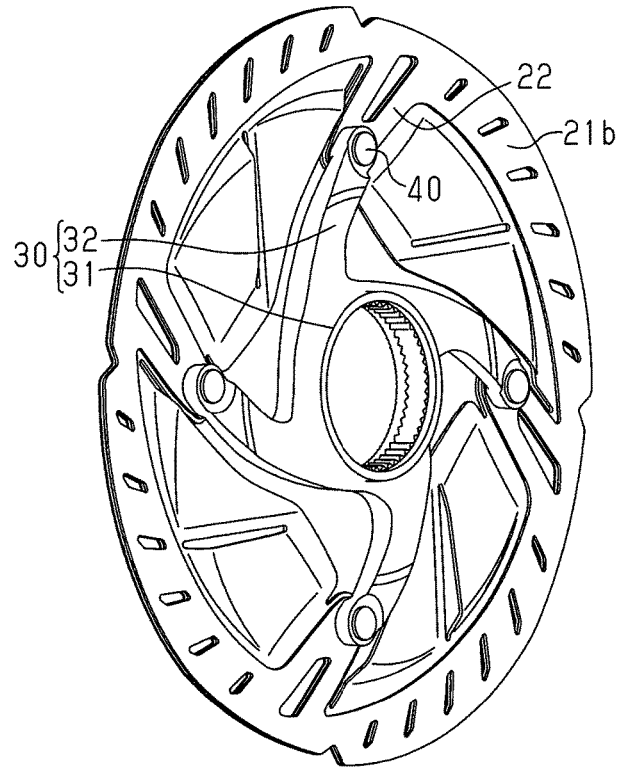

As illustrated in FIGS. 2 to 4, the bicycle disc brake rotor 10 includes an outer member 20 and an inner member 30, which is located at the inner side of the outer member 20 in the radial direction of the bicycle disc brake rotor 10. The outer member 20 and the inner member 30 are discrete members that are separately manufactured and are typically metal members. The inner member 30 is coupled by a coupling portion CX to the outer member 20. The coupling portion CX includes, for example, a coupling pin 40. In the drawings, the coupling portion CX is indicated as the pin axis of the coupling pin 40. In addition to or instead of the coupling pin 40, the coupling portion CX may be adhesive, welding, brazing, or the like.

The outer member 20 includes a braking portion 21 extending in the rotation direction RO, tabs 22 extending radially inwardly from the braking portion 21, and cooling fins 24 located at the radially inner side of the braking portion 21. In the embodiment, one cooling fin 24 is arranged between two tabs 22 that are adjacent to each other in the rotation direction RO.

Figure 5:
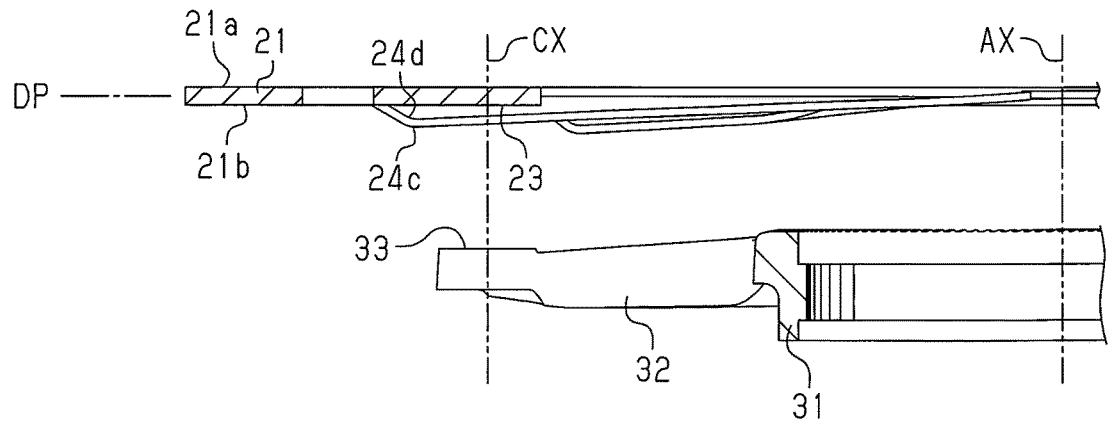
FIG. 5 is a side view of the bicycle disc brake rotor illustrated in FIG. 2.

As illustrated in FIG. 5, the braking portion 21 is substantially parallel to a rotor plane DP that is orthogonal to the center rotational axis AX of the bicycle disc brake rotor 10. The braking portion 21 includes a first braking surface 21a and a second braking surface 21b, which extends parallel to the first braking surface 21a. The braking portion 21 has a thickness determined by the distance between the first braking surface 21a and the second braking surface 21b. The axial direction of the bicycle disc brake rotor 10 may be referred to as the thickness-wise direction of the bicycle disc brake rotor 10.

The inner member 30 includes a mounting portion 31 for the bicycle wheel and arms 32 extending radially outward from the mounting portion 31. In the embodiment, the mounting portion 31 is an annular or cylindrical portion of the inner member 30, and the arms 32 are configured as outwardly-extending projections that differ from the annular or cylindrical portion. The mounting portion 31 is, for example, of a center lock type configured to be fixedly coupled to the hub shell of the bicycle wheel by the lock ring 6. The mounting portion 31 may also be of a non-center lock type configured to be fixed to the hub shell by a plurality of bolts. In the embodiment, the inner member 30 is a single-piece member.

As illustrated in FIG. 5, the tabs 22 of the outer member 20 each include a radial inner end that defines an engagement surface 23. The arms 32 of the inner member 30 each include a radial outer end that defines an engagement surface 33. The tabs 22 and the arms 32 are in direct contact at the engagement surfaces 23 and 33. The engagement surfaces 23 and 33 include pin holes that receive the coupling pins 40. The tabs 22 of the outer member 20 are placed on the arms 32 of the inner member 30. The coupling pins 40 couple the tabs 22 to the arms 32. In the embodiment, one or both of the engagement surfaces 23 and 33 may include a positioning step. The outer member 20 and the inner member 30 are not in contact at portions excluding the engagement surfaces 23 and 33.

Figure 6:
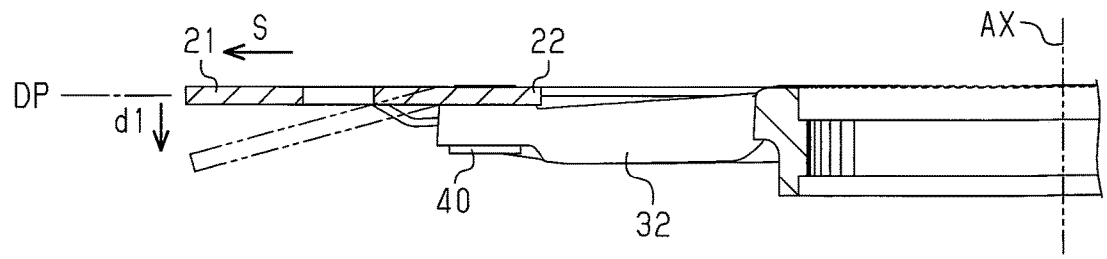
FIG. 6 is a schematic view illustrating displacement of a braking portion in an axial direction of the bicycle disc brake rotor.

Brake heat (friction heat) will now be described with reference to FIG. 6. In the bicycle disc brake rotor 10 of the embodiment, when braking results in a sudden temperature rise, the braking portion 21 thermally expands outwardly in the radial direction as indicated by arrow S. As indicated by arrow d1 in FIG. 6, the thermal expansion mainly displaces the braking portion 21 in the axial direction of the bicycle disc brake rotor 10 and inclines the braking portion 21 relative to the rotor plane DP. In this specification, the displacement d1 is referred to as the axial displacement d1 caused by brake heat. The mode in which the outer member 20 is coupled to the inner member 30 determines whether the braking portion 21 is displaced toward one side or the other in the axial direction. More specifically, in the bicycle disc brake rotor 10 of the embodiment, the engagement surfaces 33 of the arms 32 are located closer to the wheel of the bicycle (toward lower side in plane of FIG. 6) than the engagement surfaces 23 of the tabs 22. In other words, the outer member 20 is coupled to the arms 32 at the side opposite to the bicycle wheel. In such a case, the braking portion 21 is generally displaced about the radially outer ends of the arms 32 toward the wheel of the bicycle. In the bicycle disc brake rotor 10 of the embodiment, at least one displacement reducing structure configured to reduce the axial displacement d1 is arranged on one or both of the outer member 20 and the inner member 30. For example, the tabs 22 of the outer member 20 and/or the arms 32 of the inner member 30 may include the displacement reducing structure. In FIG. 6, the axial displacement d1 is shown larger than actual to aid understanding.

In the embodiment, the tabs 22 and/or the arms 32 are each configured to include an expansion portion that expands, or extends in length, in accordance with the radial expansion of the braking portion 21 resulting from brake heat. The expansion portions of one or both of the tabs 22 and the arms 32 expand in accordance with the radial expansion of the braking portion 21 resulting from brake heat to relax the mechanical restriction or constraint on the radially outward expansion of the braking portion 21. This reduces the axial displacement d1 of the braking portion 21.

In the technical field of bicycle disc brake rotors, it is believed that a bicycle disc brake rotor needs to be as rigid as possible to prevent the transmission loss of a braking force from the braking portion to the bicycle wheel. As described hereafter, the bicycle disc brake rotor 10 of the embodiment takes an epoch-making approach by providing the outer member 20 and/or the inner member 30 with the expansion portions to reduce the axial displacement d1 in the braking portion and consequently decrease or prevent friction noise. The displacement reducing structure that includes the expansion portions will now be described in detail.

Figure 7:
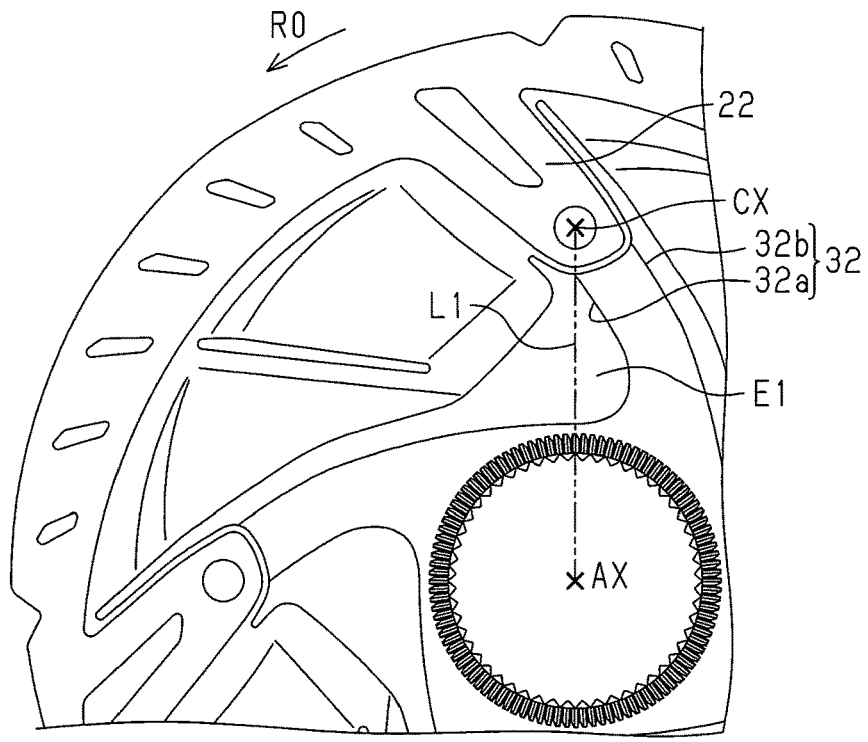
FIGS. 7 to 9 are partial, enlarged plan views of the bicycle disc brake rotor as viewed in the axial direction.

With reference to FIG. 7, each arm 32 includes a downstream arm edge 32a, which is located at a downstream side with respect to the rotation direction RO indicated by the arrow, and an upstream arm edge 32b, which is located at an upstream side. When the bicycle travels forward, the downstream arm edge 32a is ahead of the upstream arm edge 32b. Accordingly, with respect to the air current produced during rotation, the downstream arm edge 32a and the upstream arm edge 32b are respectively referred to as a leading edge and a trailing edge of the arm 32. Reference character L1 in FIG. 7 denotes a hypothetical straight line drawn in the radial direction from the center rotational axis AX and through the coupling portion CX (pin axis) of a tab 22 and an arm 32. When viewing the hypothetical straight line L1 in the axial direction, the arm 32 forms an empty space E1 between the hypothetical straight line L1 and the downstream arm edge 32a. The open space E1 promotes deformation of the arm 32 in the rotor plane DP as the arm 32 follows radially outward expansion of the braking portion 21. For example, the maximum expansion amount and/or the allowable arm warpage angle are increased in the rotor plane DP.

In the embodiment, the arm 32 has a curved profile and is inclined and curved relative to the radial direction. The curved profile elongates the arm length and increases the thermal expansion capacity of the arm 32. This improves the effect for reducing the axial displacement D1.

It is preferred that the open space E1 be formed by the entire downstream arm edge 32a and the hypothetical straight line L1. The open space E1 may be formed by at least part of the downstream arm edge 32a and the hypothetical straight line. The arm 32 may have a straight profile and be inclined relative to the radial direction to form the open space E1.

Figure 8:
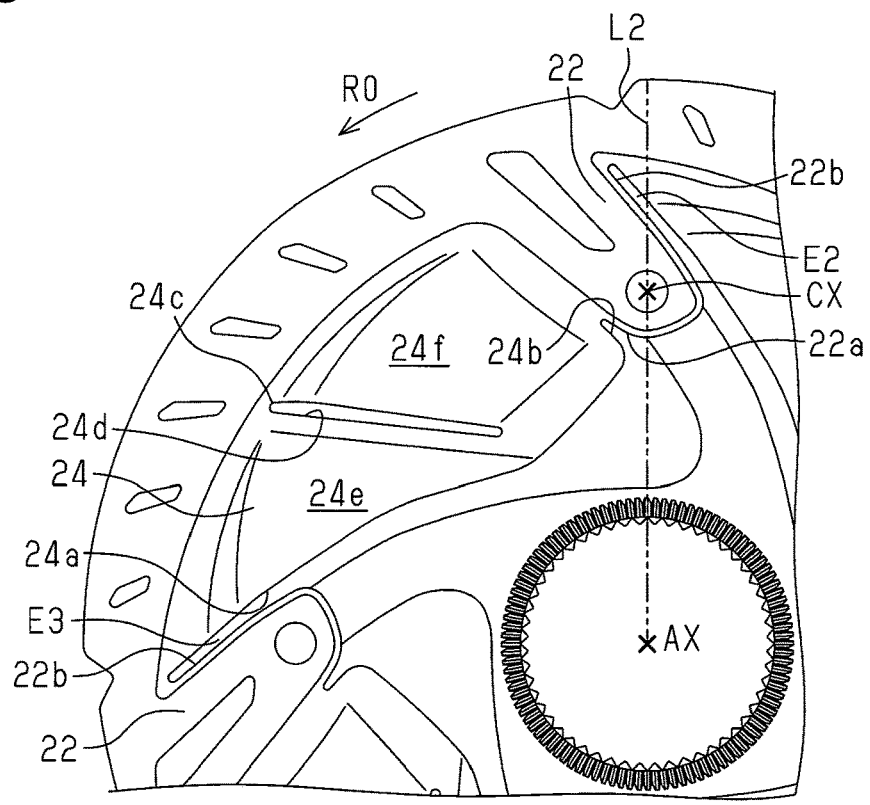

As illustrated in FIG. 8, each tab 22 includes a downstream tab edge 22a, which is located at a downstream side with respect to the rotation direction RO indicated by the arrow, and an upstream tab edge 22b, which is located at the upstream side. When the bicycle travels forward, the downstream tab edge 22a comes ahead of the upstream tab edge 22b. Accordingly, with respect to the air current produced during rotation, the downstream tab edge 22a and the upstream tab edge 22b are respectively referred to as a leading edge and a trailing edge of the tab 22. Reference character L2 in FIG. 8 denotes a hypothetical straight line drawn in the radial direction from the center rotational axis AX and through the coupling portion CX (pin axis). When viewing the hypothetical straight line L2 in the axial direction, the upstream tab edge 22b forms a tab empty space E2 between the hypothetical straight line L2 and the upstream tab edge 22b. The tab open space E2 promotes deformation of the tab 22 in the rotor plane DP as the tab 22 follows radially outward expansion of the braking portion 21. For example, the maximum expansion amount and/or the allowable arm warpage angle are increased in the rotor plane DP.

In the embodiment, the tab 22 has an inclined profile and is inclined relative to the radial direction to obtain the tab open space E2. The inclined profile of the tab 22 elongates the tab length. The increased expansion capacity of the tab 22 improves the effect for reducing the axial displacement D1. In the embodiment, the tab open space E2 has an end located at the boundary of the braking portion 21 and the tab 22.

The tab 22 may have a curved profile and be inclined and curved relative to the radial direction to form the tab open space E2.

As illustrated in FIG. 8, each cooling fin 24 includes a downstream fin edge 24a, which is located at a downstream side with respect to the rotation direction RO indicated by the arrow, and an upstream fin edge 24b, which is located at the upstream side. A fin open space E3 is formed between the downstream fin edge 24a and the upstream tab edge 22b of the adjacent tab 22. In the embodiment, the downstream fin edge 24a is curved. Further, part of the fin open space E3 defines the tab open space E2.

As illustrated in FIGS. 3, 5, and 8, each cooling fin 24 includes a step 24c that intersects the rotation direction RO. The step 24c is formed to project toward the bicycle wheel side (toward side under plane of FIG. 8). The step 24c includes an opening 24d. In the embodiment, the opening 24d may be elongated to have ends in the radially outer and inner sides. The opening 24d may be referred to as the fin window. It is preferred that the step 24c (i.e., opening 24d) be extended to incline relative to the radial direction. The opening 24d may be straight or curved. The opening 24d is located between the front edge (24a) and a rear edge (24b) of the cooling fin 24. The cooling fin 24 includes a front fin portion 24e, which extends from the front edge (24a) to the opening 24d, and a rear fin portion 24f, which extends from the opening 24d to the rear edge (24b) of the cooling fin 24.

When the bicycle travels, air currents flow from the fin open space E3 and the opening 24d along the cooling fin 24. The air current from the fin open space E3 cools the front fin portion 24e, and the air current from the opening 24d cools the rear fin portion 24f. The downstream fin edge 24a and the opening 24d cooperate to promote heat radiation from the entire cooling fin 24.

The cooling fins 24 are located between the tabs 22 in the rotation direction RO, respectively. In the embodiment, a single cooling fin 24 is located between two tabs 22 that are adjacent to each other in the rotation direction RO.

Figure 9:
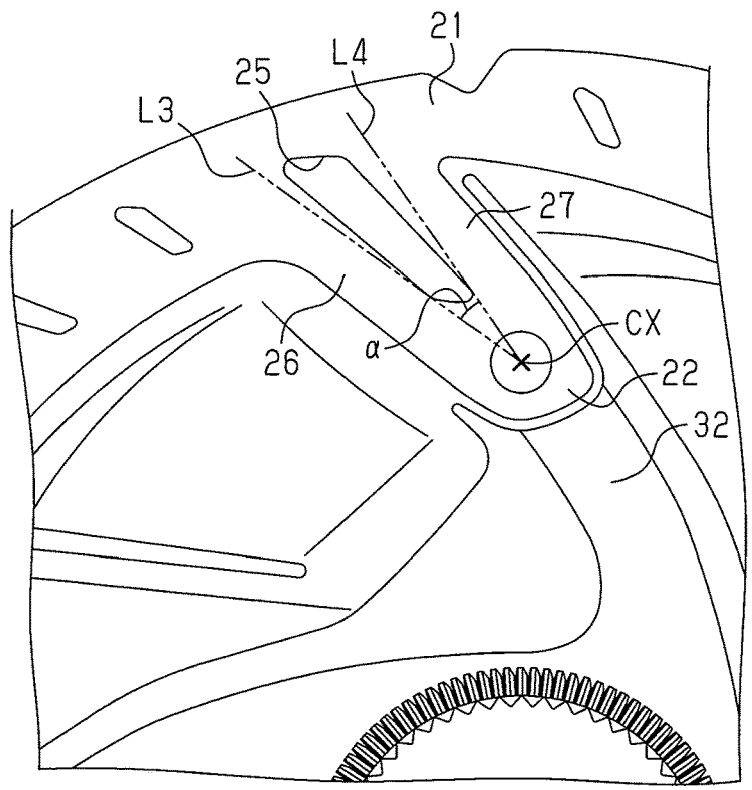

As illustrated in FIG. 9, the outer member 20 includes a through hole 25, extending from the braking portion 21 toward each coupling portion CX (pin axis), and two opposing portions 26 and 27, which are opposed to each other in the rotation direction RO with the through hole CX located in between. FIG. 9 illustrates angle α between a first hypothetical straight line L3 and a second hypothetical straight line L4 at the coupling portion CX. The first hypothetical straight line L3 is drawn from the coupling portion CX to contact the through hole 25 at the side of the opposing portion 26. The second hypothetical straight line L4 is drawn from the coupling portion CX to contact the through hole 25 at the side of the opposing portion 27. Neither one of the hypothetical straight lines L3 and L4 extend through the through hole 25. Angle α is less than 45 degrees.

At least part of the through hole 25 is formed in the tab 22. At least part of each of the opposing portions 26 and 27 is referred to as a side bridge portion of the tab 22. In the embodiment, the through hole 25 is an elongated hole extending along the tab 22. The through hole 25 is inclined relative to the radial direction. The setting of angle α promotes the expansion of the tab 22 and relaxes the mechanical restriction or constraint applied by the tab 22 to the radially outward expansion of the braking portion 21.

There is no particular limit to the lower limit of angle α. The shape of the through hole 25 may be set in accordance with mechanical requirements of the bicycle disc brake rotor 10 such as the transmission loss of the braking force.

The tab 22 may include a plurality of through holes 25 aligned from the braking portion 21 toward the coupling portion CX. In this case, the angle α and the hypothetical straight lines L3 and L4 are set for the through hole 25 that is closest to the coupling portion CX in the line of through holes.

Figure 10:
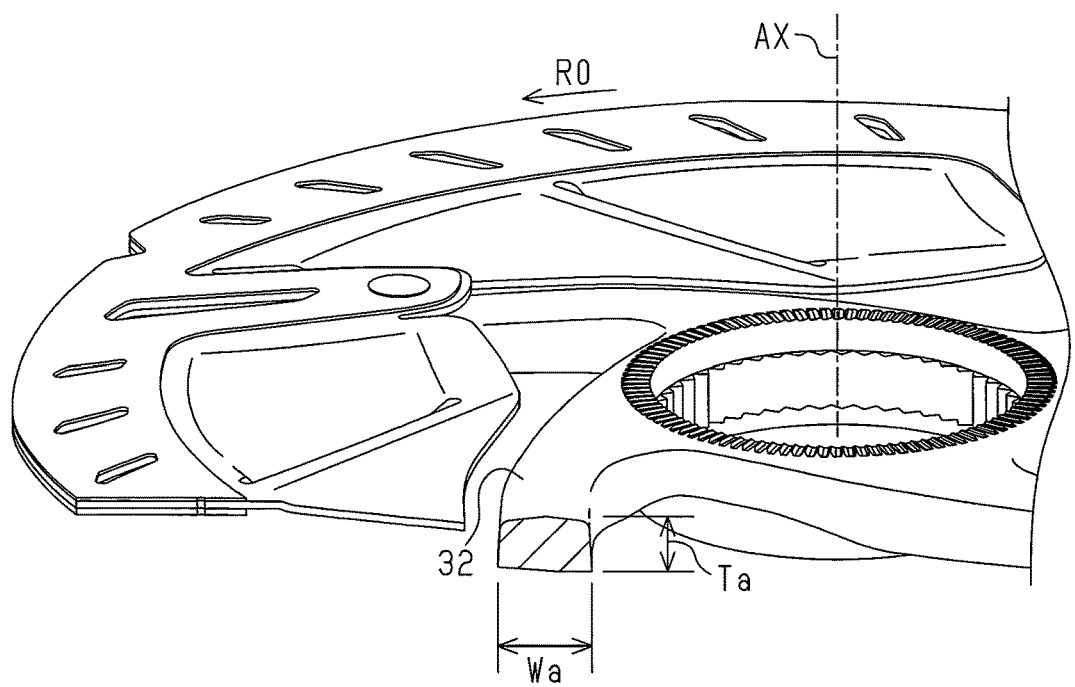
FIG. 10 is a partial, cross-sectional view of the bicycle disc brake rotor.

As illustrated in FIG. 10, each arm 32 has an arm thickness Ta in the axial direction and an arm width Wa in the rotation direction RO. The ratio (Ta/Wa) of the arm thickness Ta to the arm width Wa is set to 0.66 or greater.

The arm thickness Ta and the arm width Wa are values measured at the narrowest arm portion, or the portion where the cross-sectional area is the smallest, in the arm body excluding the distal portion of the arm 32 that is overlapped with the tab 22. When the arm 32 does not have a square or rectangular cross-section, the maximum arm thickness and the maximum arm width at the narrowest arm portion are the arm thickness Ta and the arm width Wa.

When the arm 32 follows the radially outward expansion of the braking portion 21, the lower limit of 0.66 for the ratio (Ta/Wa) at the narrowest arm portion promotes expansion of the arm 32 in the longitudinal direction of the arm in the rotor plane DP and/or warpage of the arm 32 in the rotor plane DP.

The upper limit of the ratio (Ta/Wa) may be set in accordance with the mechanical requirement of the bicycle disc brake rotor 10 such as the braking force transmission loss.

Figure 11:
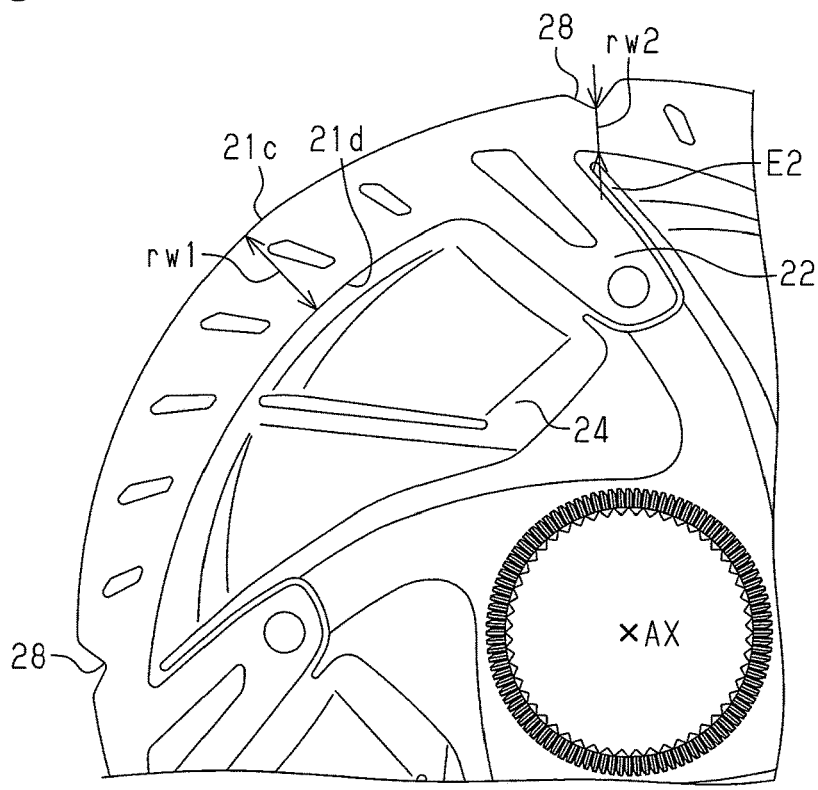
FIG. 11 is a partial, enlarged plan view of the bicycle disc brake rotor as viewed in the axial direction.

As illustrated in FIG. 11, the braking portion 21 includes radially outermost edge 21c and a radially innermost edge 21d. The braking portion 21 has a non-uniform radial width between the radially outermost edge 21c and the radially innermost edge 21d. The minimum radial width rw1 of the braking portion 21 is 65% or less of the maximum radial width rw1 of the braking portion 21, preferably, 60% or less, and further preferably, 50% or less. In the embodiment, the minimum radial width rw2 is approximately 43% of the maximum radial width rw1.

The braking portion 21 includes notches 28 at portions corresponding to the minimum radial width rw2. The notches 28 are formed in the radially outermost edge 21c of the braking portion 21. In the embodiment, the notches 28 and the tab open spaces E2 obtain the minimum radial width rw2.

In the embodiment, a hypothetical circle having a radius corresponding to the maximum diameter of the bicycle disc brake rotor 10 contacts the radially outermost edge 21c at only positions corresponding to the maximum radial width rw1. The distance between the radially outermost edge 21c and the hypothetical circle gradually changes but suddenly changes at portions corresponding to the minimum radial width rw2. The portions corresponding to the minimum radial width rw2 (notches 28) function as expansion portions.

Referring again to FIG. 6, it is assumed that friction noise is produced when the outermost edge corresponding to the maximum diameter of the bicycle disc brake rotor first contacts the brake pads. In the embodiment, the expansion of the braking portion 21 at portions corresponding to the minimum radial width rw2 (notches 28) is greater than other parts of the braking portion 21. As a result, axial displacement d1 is reduced at parts of the braking portion 21 corresponding to the maximum radial width rw1, and friction noise is reduced.

The radially outermost edge 21c may be in conformance with an arc having a constant radius. The radially outermost edge 21c does not necessarily have to include the notches 28 at portions corresponding to the tab open spaces E2. The notches 28 may be formed in the radially innermost edge 21d of the braking portion 21.

Figure 12:
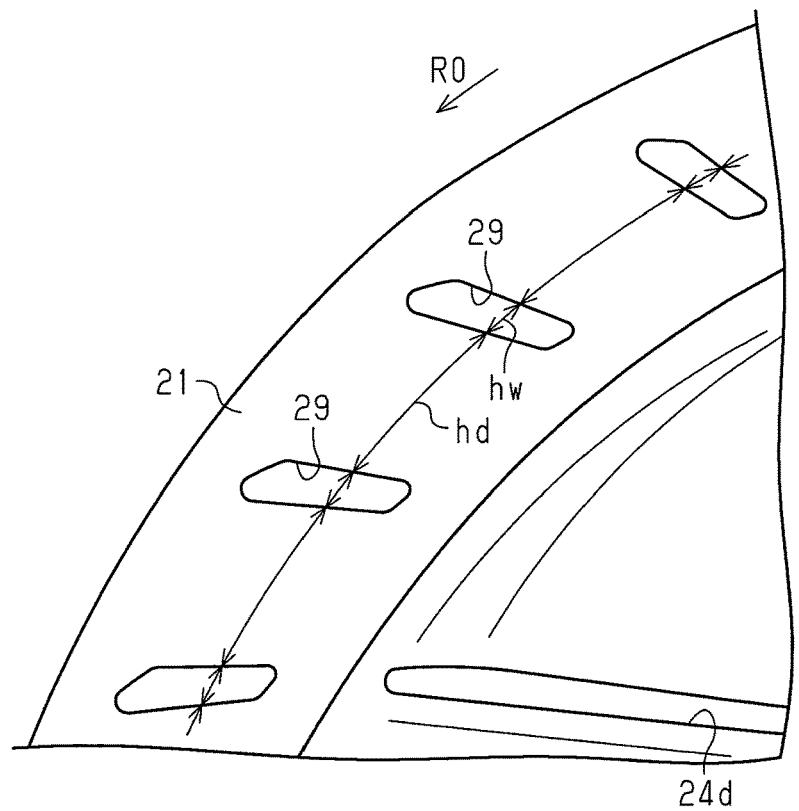
FIG. 12 is an enlarged view of the braking portion.

As illustrated in FIG. 12, the braking portion 21 includes a plurality of recesses 29 arranged in the rotation direction RO. The recesses 29 of the embodiment are through holes but may be dimples provided in the first braking surface 21a and/or the second braking surface 21b.

Each recess 29 has a recess width hw in the rotation direction RO. Two recesses 29 that are adjacent to each other in the rotation direction RO are spaced apart in the rotation direction RO by a minimum distance hd. The ratio of the minimum distance hd relative to the recess width hw (hd/hw) is 2.5 or greater. The ratio hd/hw of 2.5 or greater increases the heat transfer width or heat transfer area of the braking portion 21 in the radial direction and smoothly transfers heat from the braking portion 21 to the cooling fins 24. As a result, the temperature of the braking portion is lowered, and heat deformation of the braking portion 21 is reduced. Further, the heat gradient is decreased at the braking portion 21 during braking, that is, local temperature differences are decreased in the braking portion 21. This reduces random, or unpredictable, thermal deformation in the braking portion 21 and improves thermal deformation controllability of the braking portion 21. The recesses 29, the outer member 20, and/or the expansion portions of the inner member 30 cooperate to decrease axial deformation d1 of the braking portion 21 resulting from brake heat and to reduce friction noise. Further, the recesses 29 reduce the weight of the bicycle disc brake rotor 10 and improve the aesthetic appeal.

The upper limit of the ratio hd/hw is not particularly limited and may be set in accordance with non-thermal requirements such as the rigidity of the braking portion 21, the abrasion resistance of the braking portion and the brake pad, and the braking force.

Figure 13:
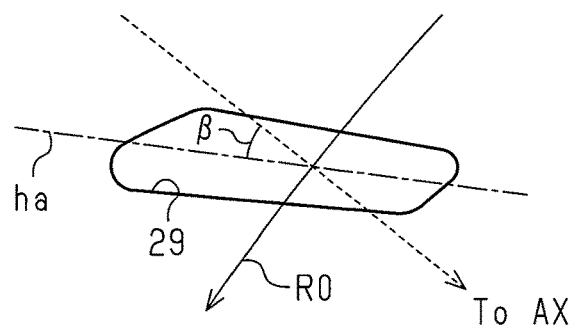
FIG. 13 is an enlarged view of a recess in the braking portion illustrated in FIG. 12.

As illustrated in FIG. 13, the recess 29 is formed to extend along a longitudinal axis Ha. In the embodiment, the minimum angle β of the longitudinal axis ha relative to the radial direction is less than or equal to 80 degrees. This increases the minimum distance hd between the recesses 29 and smoothly transfers heat from the braking portion 21 to the cooling fins 24.

Figure 14:
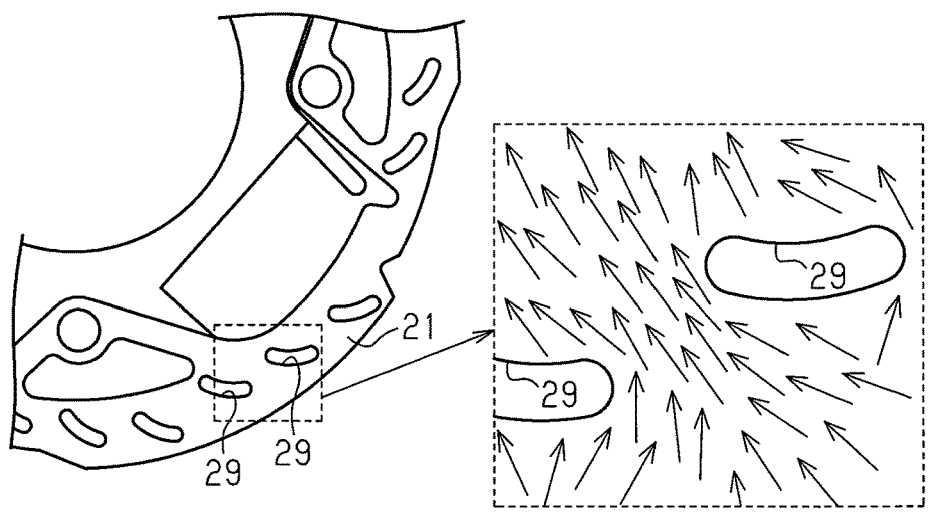
FIG. 14 is a schematic view illustrating the movement of heat in a braking portion of an example.
Figure 15:
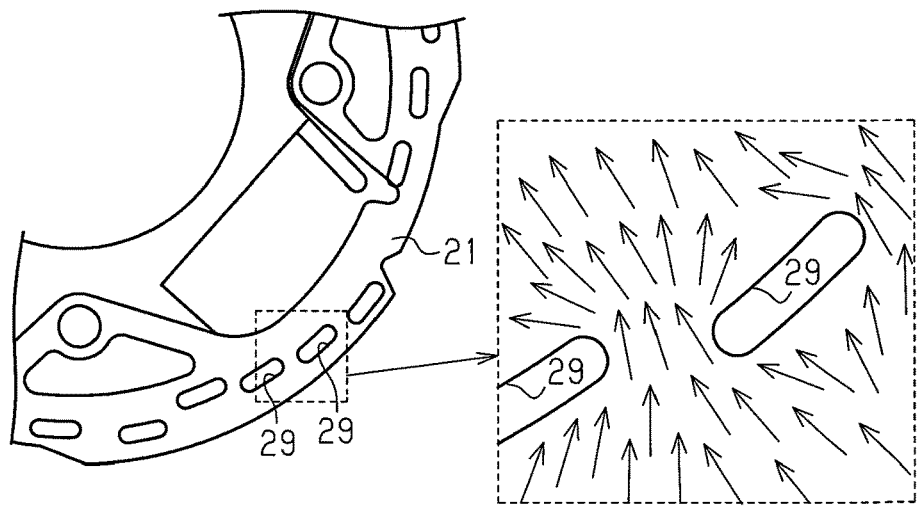
FIG. 15 is a schematic view illustrating the movement of heat in a braking portion of a referential example.

The experimental results of heat transfer in the braking portion 21 will now be described. A continuous braking experiment simulating a situation traveling downhill while keeping the speed constant and a sudden braking experiment simulating full braking were conducted. FIG. 14 illustrates an example in which angle β is 60 degrees, and FIG. 15 illustrates a referential example in which angle β is 90 degrees. The conditions are the same in the example and the referential example except for angle β. The arrows in FIGS. 14 and 15 illustrate the movement of heat in the braking portion.

The temperature of the braking portion after the continuous braking experiment was approximately 306 degrees in the example and approximately 300 degrees in the referential example. The temperature of the braking portion after the sudden braking experiment was approximately 553 degrees in the example and approximately 536 degrees in the referential example. It was confirmed that the setting of the angle β significantly lowers the temperature. The angle β is preferably 80 degrees or less and further preferably 60 degrees or less.

Figure 16:
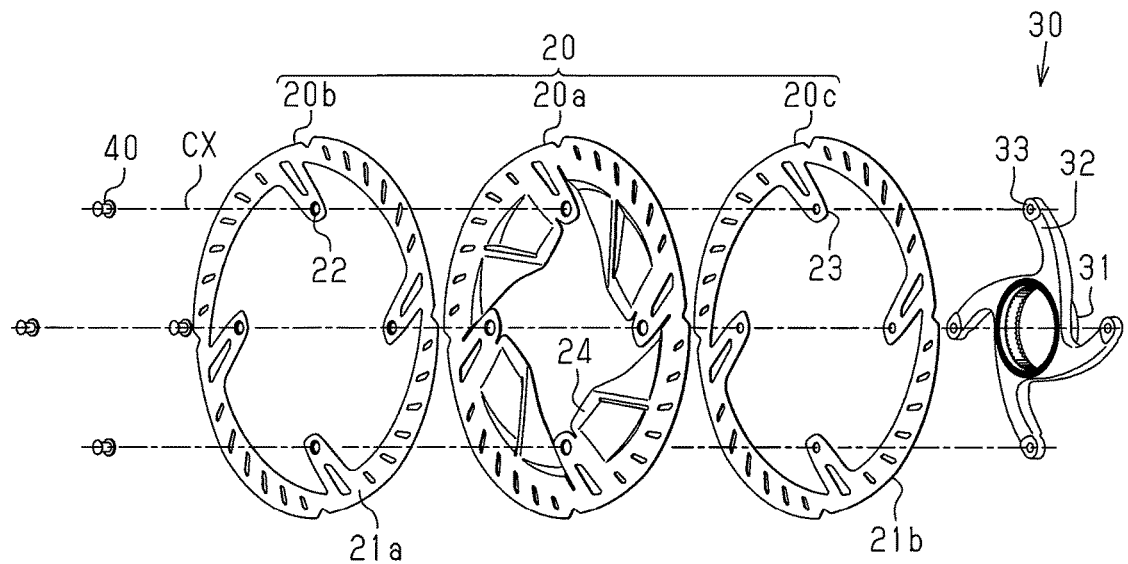
FIG. 16 is an exploded perspective view of the bicycle disc brake rotor illustrated in FIG. 2.

The outer member 20 may be a single-piece member. However, the outer member 20 may have a stacked structure. For example, as illustrated in FIG. 16, the outer member 20 may include a base 20a, a first cover 20b, and a second cover 20c. The first cover 20b and the second cover 20c are arranged on opposite sides of the base 20a in the axial direction.

The base 20a is formed from a first material such as an aluminum alloy that is superior in thermal conductivity to the first cover 20b and the second cover 20c. The first cover 20b and the second cover 20c are formed from an abrasion-resistant material such as stainless steel that is superior in abrasion resistance to the first material. The first cover 20b and the second cover 20c may be formed from the same material or from different materials.

In the embodiment, the cooling fins 24 are included in the base 20a. The first braking surface 21a is included in the first cover 20b. The second braking surface 21b is included in the second cover 20c. The cooling fins 24 are not included in the first cover 20b and the second cover 20c.

Figure 17:
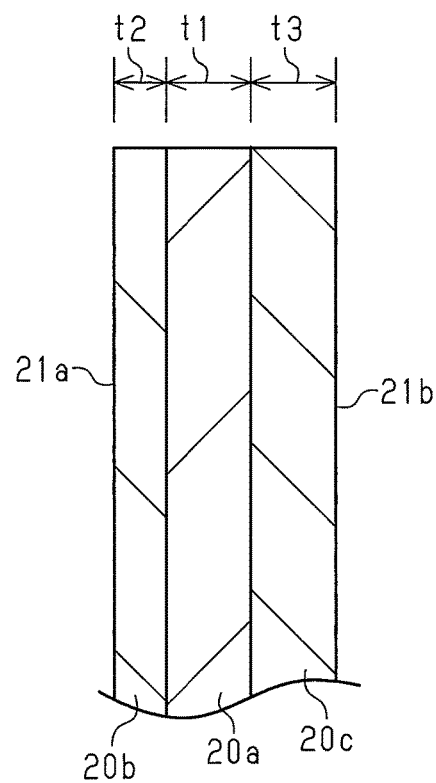
FIG. 17 is a partial, cross-sectional view of the bicycle disc brake rotor illustrated in FIG. 16.

With reference to FIG. 17, thicknesses t1, t2, and t3 of the base 20a, the first cover 20b, and the second cover 20c will now be described.

The thickness t2 of the first cover 20b differs from the thickness t3 of the second cover 20c. More specifically, the thickness t2 of the first cover 20b is smaller than the thickness t3 of the second cover 20c. The thickness t2 of the first cover 20b is smaller than the thickness t1 of the base 20a. The thickness t3 of the second cover 20c is smaller than the thickness t1 of the base 20a but may be the same.

In the present embodiment, the thickness t1 of the base 20a is approximately 0.5 mm to approximately 1.5 mm. The thickness t2 of the first cover 20b and the thickness t3 of the second cover 20c is approximately 0.2 mm to approximately 0.8 mm. The thicknesses t1 to t3 are set to be in these ranges to reduce the axial displacement d1 of the braking portion 21 while reinforcing the braking portion 21, reducing the weight of the braking portion 21, and improving the heat radiation performance of the braking portion 21 at the same time.

There is particularly no limit to the method for manufacturing the bicycle disc brake rotor 10. However, the bicycle disc brake rotor 10 may be manufactured in accordance with the manufacturing method of US 2006/0037819 A1, which is incorporated herein by reference.

The present invention is not limited to the above embodiment. For example, the embodiment may be modified as described below.

The arms 32 may all include the expansion portion described in the embodiment. However, at least one of the arms 32 may include the expansion portion. For example, at last one of the arms 32 may be curved, and the remaining arms 32 may be non-curved. The tabs 22 may all include the expansion portion described in the embodiment. However, at least one of the tabs 22 may include the expansion portion. For example, at least one of the tabs 22 may include the through hole 25, and the remaining tabs 22 may be less the through hole 25. When taking into account the rotation balance of the bicycle disc brake rotor 10, the expansion portion may be arranged in the tabs 22 and the arms 32 at a position selected to obtain rotational symmetry about the center rotational axis AX.

It should be apparent to those skilled in the art that the present invention may be embodied in many other specific forms without departing from the scope of the invention. For example, some of the components may be omitted from the components described in the embodiments (or one or more aspects thereof). Further, components in different embodiments may be appropriately combined. The scope of the present invention and equivalence of the present invention are to be understood with reference to the appended claims.

The invention claimed is:

1. A bicycle disc brake rotor including a center rotational axis, the bicycle disc brake rotor comprising:
   an outer member including a braking portion extending in a rotation direction of the bicycle disc brake rotor, the braking portion having a first thickness; and
   an inner member located at an inner side of the outer member in a radial direction of the bicycle disc brake rotor and coupled to the outer member, the inner member including an annular or cylindrical mounting portion for a bicycle wheel, the annular or cylindrical mounting portion having a second thickness that is greater than the first thickness, the inner member including arms, each arm extending outward in the radial direction from the annular or cylindrical mounting portion,
   wherein:
   the outer member includes tabs extending radially inwardly from the braking portion and coupled to the arms, respectively,
   at least one of the outer member and the inner member includes a displacement reducing structure configured to reduce displacement of the braking portion in an axial direction of the bicycle disc brake rotor in accordance with expansion of the braking portion in the radial direction resulting from brake heat,
   the displacement reducing structure includes an expansion portion that expands in accordance with expansion of the braking portion in the radial direction resulting from brake heat,
   the expansion portion includes the arms, each of which is a branchless projection including a radially innermost portion directly coupled to an outer peripheral wall of the annular or cylindrical mounting portion, a radially outermost portion directly coupled to the corresponding tab of the outer member, and a curved intermediate portion extending from the radially innermost portion to the radially outermost portion, the curved intermediate portion of each of the arms being non-contact with other portions of the bicycle disc brake rotor,
   each arm includes a downstream arm edge at a downstream side in the rotation direction,
   as a radial hypothetical straight line is drawn in the radial direction from the center rotational axis and through a coupling portion of one of the arms and the corresponding one of the tabs, the downstream arm edge of said one of the arms is arranged to form an open space between the radial hypothetical straight line and the downstream arm edge of said one of the arms in a view of the radial hypothetical straight line from an axial direction of the bicycle disc brake rotor to promote expansion of said one of the arms in a longitudinal direction of said one of the arms in a rotor plane that is orthogonal to the center rotational axis in accordance with expansion of the braking portion in the radial direction resulting from brake heat, thereby reducing displacement of the braking portion in the axial direction of the bicycle disc brake rotor,
   each tab includes a downstream tab edge at the downstream side in the rotation direction, and an upstream tab edge at an upstream side in the rotation direction,
   the braking portion includes a non-uniform radial width between a radially outermost edge and a radially innermost edge,
   the non-uniform radial width includes a maximum radial width, and a minimum radial width that is 65% or less of the maximum radial width,
   the outer member includes notches formed in the radially outermost edge of the braking portion to obtain the minimum radial width in the braking portion,
   a part corresponding to each notch and the minimum radial width of the braking portion is configured to expand to reduce displacement of the braking portion in the axial direction of the bicycle disc brake rotor resulting from brake heat, and
   in the radially outermost edge, each and every notch that forms the minimum radial width is provided between adjacent two of the tabs in the rotation direction such that a minimum distance between that notch and the upstream tab edge of one of said adjacent two of the tabs is less than a minimum distance between that notch and the downstream tab edge of the other of said adjacent two of the tabs.

2. The bicycle disc brake rotor according to claim 1, wherein
   the tab includes an upstream tab edge at an upstream side in the rotation direction, and
   the upstream tab edge is arranged to form a tab open space between the radial hypothetical straight line and the upstream tab edge.

3. The bicycle disc brake rotor according to claim 1, wherein
   the outer member includes a through hole, which extends from the braking portion toward the coupling portion of one of the tabs and the corresponding arm, and two opposing portions, which are opposed in the rotation direction with the through hole located in between;
   as a first tab hypothetical straight line is drawn from the coupling portion of said one of the tabs to contact the through hole at a side where one of the opposing portions is located and a second tab hypothetical straight line is drawn from the coupling portion of said one of the tabs to contact the through hole at a side where the other one of the opposing portions is located, an angle between the first tab hypothetical straight line and the second tab hypothetical straight line about the coupling portion is less than 45 degrees in a view of the first tab hypothetical straight line and the second tab hypothetical straight line from the axial direction.

4. The bicycle disc brake rotor according to claim 1, wherein
   the inner member including the arms is thicker than the outer member as measured in the axial direction of the bicycle disc brake rotor,
   the expansion portion includes the arms, and each of the arms includes a smallest cross-sectional area portion, and the smallest cross-sectional area portion has an arm thickness in the axial direction of the bicycle disc brake rotor and an arm width in the rotation direction, and
   a ratio of the arm thickness to the arm width at the smallest cross-sectional area portion is set to 0.66 or greater to promote expansion of each of the arms in a longitudinal direction of each of the arms in a rotor plane that is orthogonal to the center rotational axis, thereby reducing displacement of the braking portion in the axial direction of the bicycle disc brake rotor resulting from brake heat.

5. The bicycle disc brake rotor according to claim 1, further comprising a cooling fin located inward in the radial direction from the braking portion of the outer member, wherein
the tabs each include an upstream tab edge at an upstream side in the rotation direction, and
the cooling fin includes a downstream fin edge at a downstream side in the rotation direction and is arranged to form a fin open space between the downstream fin edge and the upstream tab edge.

6. The bicycle disc brake rotor according to claim 5, wherein
the cooling fin includes a step in the rotation direction, and
the step includes an opening.

7. The bicycle disc brake rotor according to claim 6, wherein the step extends inclined relative to the radial direction.

8. The bicycle disc brake rotor according to claim 5, wherein the cooling fin is arranged between respective ones of the tabs in the rotation direction.

9. The bicycle disc brake rotor according to claim 1, wherein each tab is coupled to the corresponding arm by a coupling pin.

10. The bicycle disc brake rotor according to claim 1, wherein the outer member is coupled to the arms at a side opposite to the bicycle wheel.

11. The bicycle disc brake rotor according to claim 1, wherein
the braking portion includes a plurality of recesses arranged in the rotation direction,
the recesses each have a recess width in the rotation direction,
two of the recesses that are adjacent to each other in the rotation direction are spaced apart by a minimum distance in the rotation direction, and
a ratio of the minimum distance to the recess width is 2.5 or greater.

12. The bicycle disc brake rotor according to claim 11, wherein
the recesses are each formed to extend along a longitudinal axis, and
a minimum angle of the longitudinal direction from the radial direction is 80 degrees or less.

13. The bicycle disc brake rotor according to claim 1, wherein
the outer member includes a base, a first cover located on one side of the base in the axial direction, and a second cover located on another side of the base in the axial direction;
the base is formed from a first material;
the first cover is formed from a second material that differs from the first material; and
the second cover is formed from a third material that differs from the first material.

14. The bicycle disc brake rotor according to claim 13, wherein the second material and the third material are the same.

15. The bicycle disc brake rotor according to claim 14, wherein
the first cover has a first cover thickness in the axial direction,
the second cover has a second cover thickness in the axial direction, and
the second cover thickness differs from the first cover thickness.

16. The bicycle disc brake rotor according to claim 1, wherein the number of the notches in the radially outermost edge of the braking portion is equal to the number of the tabs in the outer member.

17. The bicycle disc brake rotor according to claim 16, wherein the notches are formed in the radially outermost edge of the braking portion at locations adjacent to the upstream tab edges of the tabs to obtain the minimum radial width in the braking portion at the locations adjacent to the upstream tab edges of the tabs.

* * * * *